Patented Apr. 16, 1929.

1,709,490

UNITED STATES PATENT OFFICE.

ISRAEL ROSENBLUM, OF JACKSON HEIGHTS, NEW YORK, ASSIGNOR TO VARNOL CHEMICAL CORPORATION, OF LONG ISLAND CITY, NEW YORK, A CORPORATION OF NEW YORK.

MIXED ESTER RESIN COMPLEX AND METHOD OF PRODUCING THE SAME.

No Drawing. Application filed July 21, 1928. Serial No. 294,584.

My invention relates to the esterification of acid-reacting condensates such as are obtained by condensing of phenolic bodies such as phenol or its homologues, including cresol or the cresols and aldehydes, such as formaldehyde.

The esterification of the above mentioned condensates is carried out by means of partially esterified resinous gums or solution of such gums which may be obtained by partially esterifying polyhydric alcohols with colophony or with gums derived from fossil varnish resinous gums, where one or two of the hydroxyl groups of the alcohol remains free.

Among the esters by means of which I neutralize the acid-reacting condensates may be mentioned the mono- or di-glyceridic abietates as such or in solution with other substances such as gums of low acid value, oils, etc. In this way I obtain fusible and high molecular weight resins which have a high melting point, are practically neutral, are soluble in drying oils and other solvents, and are very suitable for the manufacture of varnishes.

The condensates obtained by condensing phenolic bodies with aldehydes have a very high acid value ranging from 120 acid value to 50 or somewhat lower and it has been for a very long time recognized that such products are not suitable for neutral or practically neutral varnishes particularly where weather resisting varnishes are desired.

Many attempts have been made to neutralize such condensates with glycerol but up to now no commercially successful process has been developed. The initial fusible condensate dissolves first in glycerol but upon raising the temperature above 200° C. a rubbery substance is obtained, particularly when the condensate contains more than .5 mol of combined formaldehyde to 1 mol of phenolic body, which product is insoluble and almost infusible. If fusible products are obtained it is found that the reaction between the condensate and the gylcerol has been almost negligible.

It has been proposed to neutralize condensates with glycerol in the presence of colophony, but in this case the colophony acts only as a solvent without entering into chemical combination with the acidic condensate and the glycerol added to it neutralizes the colophony without neutralizing the condensate to any marked degree; and consequently a mechanical mixture is obtained.

It is an object of the present invention so to treat phenolic-aldehydic condensates that their acid character is substantially neutralized in such a manner that extraordinarily high molecular weight resinous bodies are obtained which are neutral in reaction, soluble in the well-known varnish solvents, have a high melting point, are extremely stable and are in other respects adapted for use in varnishes.

In accordance with my invention, the initial phenolic - aldehydic condensation product is first formed, preferably in the presence of a solvent. As the phenolic body there may be used phenol, cresol, etc., while formaldehyde, acetaldehyde, etc., may represent the aldehyde. The aldehyde may be wholly or partially replaced by a ketonic body, such as acetone. The condensation produce may be formed in any well-known manner, under pressure or by refluxing, with or without a catalyzer. Any kind of solvent may be employed which is compatible both with the phenol-aldehyde condensate, and with the polyhydric-alcohol esters described below. Such solvents include turpentine, drying and non-drying oils, resins (natural or synthetic), ester gums, etc. These solvents remain such throughout the formation of the initial phenol-aldehyde condensate and do not take part in the reaction to any appreciable extent. The condensate may be dehydrated by heating up to 120 degrees C. or higher.

To effect the neutralization of this condensate, I combine therewith a substantially stoichiometric quantity of a partially esterified polyhydric alcohol, but if desired, an excess of such alcohol may be employed. Obviously, the amount of such partially substituted polyhydric alcohol to be employed will depend upon the quantity of free OH groups present which are capable of combining with the acidic OH groups (be they phenolic or carboxylic OH groups) of the phenol-aldehyde condensation product or resin. The polyhydric alcohol may be glycerol, mannitol, etc., but I prefer to use glycerol because of its cheapness. While therefore, in the subsequent description of my process I refer to glycerol and its esters, it is to be understood that the analogous compounds of the other commercially available polyhydric alcohols are included thereby.

As the acid constituent of the partially esterified polyhydric alcohol (specifically, glycerol) I prefer to use an acid of high molecular weight and of resinous nature, such as abietic acid. In general, however, any acid of high molecular weight and having resin properties may be employed, such as those which are contained in or may be derived from rosin, congo, manila, the pontiacs, the shellacs, kauri, copal, and other fossil resins.

The partially esterified polyhydric alcohol may be prepared in any desired way; for instance, an excess of the alcohol may be treated with the acid under the known conditions favorable for esterification so as to obtain mono- and di-glyceridic gums whose content in the final product may be as high as 30–35% or higher, by controlling the conditions of esterification, as described, for instance, in my co-pending application, Serial No. 336,632, filed January 31, 1929.

This mixture containing, for instance, partially esterified (mono- and di-) glycerol abietate (or more correctly, glycerol mono and di-abietate) is combined in proper quantity, as stated above, with the phenol-aldehyde condensation product. The mono- and di-glyceridic esters are preferably first dissolved, prior to their combination with the condensate, in a solvent which is compatible with the condensate and with its solvent, if any was used. Examples of such ester solvents are the resins or the completely esterified polyhydric alcohols such as the tri-glyceridic ester gums which may be produced at the same time, and in general, the solvents may be of either volatile or non-volatile nature. The reaction may be carried on at between 250 degrees C. and 300 degrees C. or higher with or without pressure or vacuum.

The reaction between the phenolic condensation product and the mono- and di-glyceridic esters may be indicated as follows:

If we let—R–OH represent the phenol-aldehyde condensation product, the OH being phenolic or carboxylic; and

represent the resin acid, such as abietic acid; then

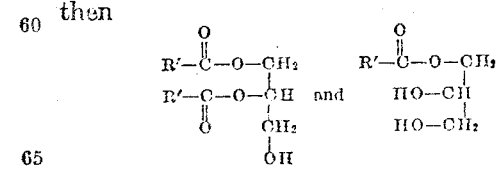

represent the di- and mono-glyceridic esters respectively, and

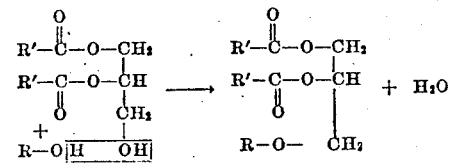

and

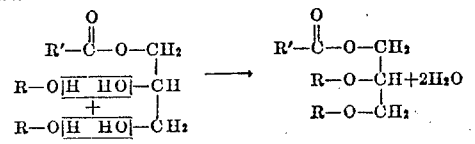

From the above it will be apparent that the new complex resin of high molecular weight produced by me may be regarded as mixed glyceridic ester in which one or two of the hydroxyl groups of the original glycerol have been replaced by one or two molecules or abietic acid residue while two or one, respectively, of the hydroxyl groups have been replaced by two or one molecules of the phenol-aldehyde condensation product acid residue.

In order to explain my invention more fully several examples of my process will now be given, but it will be understood that these examples are merely illustrative and are not intended to define the limits of my invention.

*Example 1.*—100 parts of cresol or phenol dissolved in 100 parts turpentine or in any other solvent and 100 parts of formaldehyde solution (containing 37–40% of formaldehyde) are heated to 90°–110° C. under pressure or by refluxing, with or without a catalyst, until the reaction is completed.

The mechanical $H_2O$ as well as the $H_2O$ of reaction is distilled off and the temperature gradually raised to about 120° C. and the product kept at such temperature for a short time. The dehydrated condensate solution usually contains about 35–40% of the phenolic condensation product, 45–50% of turpentine and 15–10% of cresol or phenol. This product will be designated condensate (A).

100 parts of condensate (A) are incorporated, by heating, with 120 parts, or if somewhat softer gums are desired, with 160 parts of a di-glyceridic abietate solution which may be composed of about 25% by weight of the diglyceridic gum dissolved in about 75% by weight of triglyceridic, which acts as a solvent, or in any other solvent compatible both with the di-glyceridic abietate (which may, and usually does, contain the mono-glyceridic gum) and with the phenol-aldehyde condensation product.

The temperature is gradually raised to about 300° C. or above. The water of reaction in escaping carries with it the volatile solvents and in order to obtain a practically complete removal of the volatile constituents of the reaction mass, vacuum can be employed. In this manner a gum is obtained which is practically neutral in reaction (i. e. has an acid number of about 10 or less), has a high melting point and a high molecular weight, is stable and weather resistant and is highly suitable for the manufacture of varnishes.

*Example 2.*—By replacing the cresol or phenol of Example 1, with a mixture of cresol and phenol and proceeding as above a similar complex resin gum is obtained.

*Example 3.*—In this example the procedure given under Example 1 is followed with the exception that the 100 parts of turpentine or other solvent are substituted by about 50 parts of turpentine or any other volatile and compatible solvent and 50 parts of a neutral or practically neutral resin gum, such as triglyceridic abietate or any other practically neutral resin gum compatible both with the diglyceridic (and monoglyceridic) abietate and with the phenolic condensation product.

Variations may be resorted to within the scope of the claims without departing from the spirit of the invention.

It is to be understood that where I employ the term "phenol" in the claims, such term is to be construed generically and not specifically to the lowest member (carbolic acid) of this class of aromatic compounds.

What is claimed is:

1. The method of producing substantially neutral resinous bodies of high molecular weight which comprises reacting upon a phenol-aldehyde condensation product with a partially esterified polyhydric alcohol.

2. The method of producing substantially neutral resinous bodies of high molecular weight which comprises reacting upon a phenal-aldehyde condensation product with a polyhydric alcohol that has been partially esterified with an acid of resinous nature.

3. The method of producing substantially neutral resinous bodies of high molecular weight which comprises reacting upon a phenol-aldehyde condensation product with a polyhydric alcohol that has been partially esterfied with an acid of resinous nature in the presence of a solvent compatible with both the condensation product and the partially esterified polyhydric alcohol.

4. The method of producing substantially neutral resinous bodies of high molecular weight which comprises reacting upon a phenol-aldehyde condensation product with glycerol that has been partially esterified with an acid of resinous nature.

5. The method of producing substantially neutral resinous bodies of high molecular weight which comprises reacting upon a phenol-aldehyde condensation product with a mixture of mono- and di-glyceridic abietate.

6. The method of producing substantially neutral resinous bodies of high molecular weight which comprises reacting upon a phenol-aldehyde condensation product with a mixture of mono- and di-glyceridic abietates in the presence of a solvent for the abietates which is compatible with the condensation product.

7. The method of producing substantially neutral resinous bodies of high molecular weight which comprises condensing a phenolic body with an aldehyde in the presence of a solvent and reacting upon the resulting condensation product with a partially esterified polyhydric alcohol.

8. The method of producing substantially neutral resinous bodies of high molecular weight which comprises condensing a phenolic body with an aldehyde in the presence of a solvent and reacting upon the resulting condensation product with glycerol that has been partially esterified with an acid of resinous nature.

9. The method of producing substantially neutral resinous bodies of high molecular weight which comprises condensing a phenolic body with an aldehyde in the presence of a solvent and reacting upon the resulting condensation product with a mixture of mono- and di-glyceridic abietates.

10. The method of producing substantially neutral resinous bodies of high molecular weight which comprises condensing a phenolic body with an aldehyde in the presence of a solvent and reacting upon the resulting condensation product with a mixture of mono- and di-glyceridic abietates in the presence of a solvent for the abietates which is compatible with the condensation product.

11. The method of producing substantially neutral resinous bodies of high molecular weight which comprises condensing a phenolic body with an aldehyde in the presence of a solvent and reacting upon the resulting condensation product with a mixture of mono- and di-glyceridic abietates in the presence of the tri-abietate.

12. The method of producing substantially neutral resinous bodies of high molecular weight which comprises reacting a phenol with an aldehyde in the presence of a solvent to form a fusible condensation product, dehydrating such product at temperatures up to 120° C., and reacting such product with a solution of a mixture of mono- and di-glyceridic abietates at approximately 300° C.

13. A substantially neutral resinous complex including the mixed glyceridic ester of the acids of a phenol-aldehyde resin and a natural resin.

14. A substantially neutral high molecular weight resinous complex composed of the mixed glyceridic ester of an acidic phenol-aldehyde condensation product and abietic acid.

15. A substantially neutral resinous complex including the mixed glyceridic ester of the acids of a phenol-aldehyde resin and a natural resin dissolved in a solvent.

16. A substantially neutral resinous complex including the mixed glyceridic ester of the acids of a phenol-aldehyde resin and a natural resin, such complex being dissolved in a reaction solvent which includes the triglyceridic ester of the acid or acids of said natural resin.

17. A substantially neutral resinous complex including the mixed glyceridic ester of an acidic phenol-formaldehyde condensation product and abietic acid.

In testimony whereof I have affixed my signature.

ISRAEL ROSENBLUM.